(12) United States Patent
Petty et al.

(10) Patent No.: US 7,225,622 B2
(45) Date of Patent: Jun. 5, 2007

(54) TURBINE ENGINE NOZZLE

(75) Inventors: Dale W. Petty, Wallingford, CT (US); Alex J. O. Simpson, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 210 days.

(21) Appl. No.: 10/625,997

(22) Filed: Jul. 21, 2003

(65) Prior Publication Data
US 2007/0039328 A1 Feb. 22, 2007

(51) Int. Cl.
*F02K 1/00* (2006.01)
(52) U.S. Cl. .................... 60/771; 239/265.19
(58) Field of Classification Search ............ 60/770, 60/771; 239/265.19, 265.11
See application file for complete search history.

(56) References Cited

U.S. PATENT DOCUMENTS

| | | | |
|---|---|---|---|
| 2,880,575 A | 4/1959 | Scialla | |
| 2,995,010 A | 8/1961 | Arscott | |
| 3,163,000 A | 12/1964 | Morley et al. | |
| 3,979,065 A | 9/1976 | Madden | |
| 4,049,199 A | 9/1977 | Nightingale | |
| 4,176,792 A | 12/1979 | McCardle, Jr. | |
| 4,763,840 A | 8/1988 | Madden | |
| 4,817,871 A | 4/1989 | Berneuil et al. | |
| 5,050,803 A | 9/1991 | Wakeman et al. | |
| 5,111,992 A * | 5/1992 | Barcza | 239/127.3 |
| 5,154,052 A | 10/1992 | Giffin, III et al. | |
| 5,176,323 A | 1/1993 | Nash | |
| 5,239,815 A * | 8/1993 | Barcza | 60/228 |
| 5,494,221 A | 2/1996 | Cot et al. | |
| 5,520,336 A | 5/1996 | Jourdain et al. | |
| 5,613,636 A | 3/1997 | Zubillaga et al. | |
| 5,775,589 A | 7/1998 | Vdoviak et al. | |
| 5,797,544 A * | 8/1998 | Ward | 239/265.37 |
| 5,842,643 A | 12/1998 | Lippmeier | |
| 5,934,564 A | 8/1999 | Bouiller et al. | |
| 6,240,720 B1 * | 6/2001 | Tseng et al. | 60/770 |
| 6,378,294 B1 | 4/2002 | Abbe et al. | |
| 6,398,129 B1 * | 6/2002 | Johnson | 239/265.37 |
| 6,779,336 B2 * | 8/2004 | Allore et al. | 60/232 |
| 6,871,797 B2 * | 3/2005 | Peters | 239/265.37 |
| 7,032,835 B2 * | 4/2006 | Murphy et al. | 239/128 |

OTHER PUBLICATIONS

GB Search Report for GB Patent Application No. 0415554.5.

* cited by examiner

*Primary Examiner*—William H Rodriguez
(74) *Attorney, Agent, or Firm*—Bachman & LaPointe, P.C.

(57) ABSTRACT

A turbine engine nozzle assembly has an upstream flap and a downstream flap pivotally coupled thereto for relative rotation about a hinge axis. An actuator linkage is coupled to the downstream flap along a forward portion thereof for actuating the upstream flaps and downstream flaps between a number of throat area conditions while permitting mode changes.

17 Claims, 5 Drawing Sheets

TURBINE ENGINE NOZZLE

U.S. GOVERNMENT RIGHTS

The invention was made with U.S. Government support under contract no. N00019-02-C-3003 awarded by the U.S. Navy. The U.S. Government has certain rights in the invention.

BACKGROUND OF THE INVENTION (1) Field of the Invention

The invention relates to turbine engines. More particularly, the invention relates to variable throat turbine engine exhaust nozzles.

(2) Description of the Related Art

There is well developed field in turbine engine exhaust nozzles. A number of nozzle configurations involve pairs of relatively hinged flaps: a convergent flap upstream; and a divergent flap downstream. Axisymmetric nozzles may feature a circular array of such flap pairs. Exemplary nozzles are shown in U.S. Pat. Nos. 3,730,436, 5,797,544, and 6,398,129.

SUMMARY OF THE INVENTION

Accordingly, one aspect of the invention involves a turbine engine nozzle subassembly. A downstream flap is pivotally coupled to an upstream flap for relative rotation about a hinge axis. An actuator linkage is coupled to the downstream flap along a forward half thereof for actuating the upstream and downstream flaps between a number of throat area conditions.

In various implementations, an external flap may be pivotally coupled to the downstream flap and to an environmental structure. A span between respective coupling locations with the downstream flap and environmental structure may be extensible and contractable responsive to aerodynamic forces. Means may restrict an extensibility range of the external flap. The means may include a secondary link having a first pivotal coupling location to the environmental structure and a second pivotal coupling location to the divergent flap. The second pivotal coupling location may be intermediate coupling location of the downstream flap to the external flap and a coupling location of the actuator linkage to the downstream flap. The secondary link may have a restricted free float range relative to the downstream flap.

Another aspect of the invention involves a turbine engine nozzle having a number of flap subassemblies coupled to a static structure. The subassemblies each include an upstream flap pivotally coupled to the static structure for relative rotation about an axis essentially fixed relative to the static structure. Each subassembly further includes a downstream flap pivotally coupled to the associated upstream flap for relative rotation about a hinge axis. Means actuate articulation of the upstream and downstream flaps within a range of areas of the throat while minimizing mode change-induced throat area changes at a given design point.

In various implementations, the subassemblies may be axisymmetrically arranged about an engine centerline. The articulation may be simultaneous for each of the subassemblies. Each of the subassemblies may further include an external flap pivotally coupled to the associated downstream flap.

Another aspect of the invention involves a means for retrofitting a turbine engine or reengineering a turbine engine configuration which has or has previously had a first nozzle subassembly having a convergent flap, a divergent flap, an external flap and an actuation linkage coupled to the convergent flap. A second subassembly is installed or engineered. The second subassembly has a second convergent flap, a second divergent flap, and a second actuation linkage, optionally sharing one or more components with the actuation linkage of the first nozzle subassembly. The second actuation linkage is coupled to the second divergent flap so as to permit an aerodynamically-induced mode change articulation of the second divergent flap to rotate the second divergent flap about a non-fixed instantaneous center of rotation while simultaneously rotating the second divergent flap relative to the second convergent flap about a non-fixed hinge axis.

In various implementations, the second subassembly may provide an aerodynamic throat which has a throat area that is less sensitive to changes associated with said mode change articulation than was an area of a throat of the first nozzle subassembly. The method may entail replacing a circumferential array of such first nozzle subassemblies with a circumferential array of such second nozzle subassemblies.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
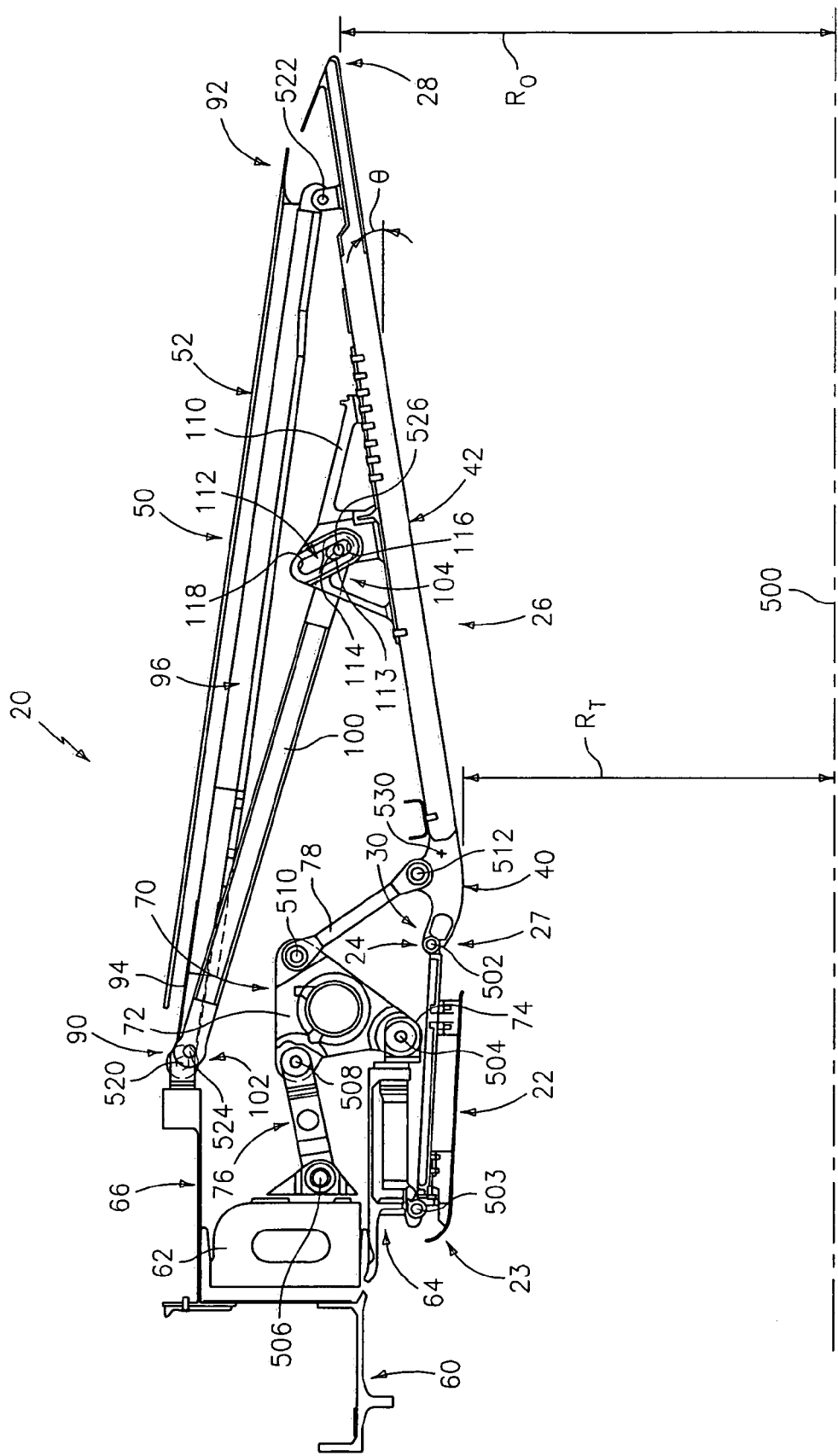
FIG. 1 is a cutaway longitudinal view of a turbine engine nozzle in a first condition.
Figure 5:
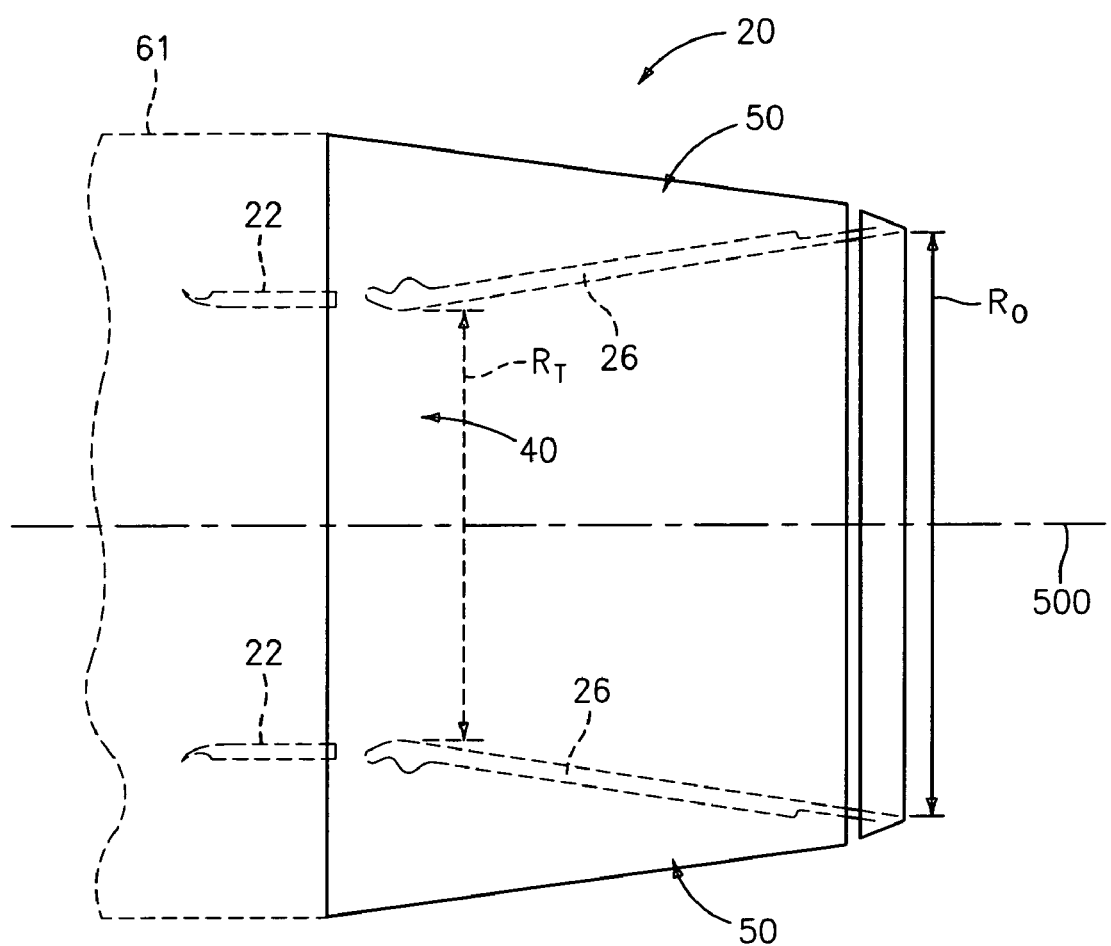
FIG. 5 is a schematic view of the nozzle of FIG. 1.

FIG. 1 shows a turbine engine nozzle 20. The exemplary nozzle comprises an axisymmetric circular array (FIG. 5) of convergent/divergent flap pairs about a nozzle axis or centerline 500. A given flap pair has a convergent flap 22 upstream/forward extending from an upstream end 23 to a downstream end 24 and a divergent flap 26 downstream/aft extending from an upstream end 27 to a downs end 28. The flaps are hinged relative to each other by a hinge mechanism 30 for relative movement about a hinge axis 502 proximate the convergent flap downstream end and divergent flap upstream end. The inboard surface of the divergent flap 26 has a longitudinally convex surface portion 40 near its upstream end for forming an aerodynamic throat (i.e., the location of smallest passageway cross-section) of the nozzle of instantaneous throat radius $R_T$ and an essentially longitudinally straight portion 42 extending aft therefrom toward the downstream end for forming an exhaust outlet of instantaneous outlet radius $R_O$. For each convergent/divergent flap pair, the nozzle further includes an external flap 50, the outboard surface 52 of which forms an exterior contour of the nozzle exposed to external airflow passing around the aircraft fuselage.

FIG. 1 further shows a nozzle static ring structure 60 for mounting the nozzle to the engine, aircraft fuselage 61 (FIG. 5), or other environmental structure. Proximate the upstream end 23 of the convergent flap 22, a hinge structure pivotally couples the convergent flap to the static ring structure 60 for relative rotation about a fixed transverse axis 503. A synchronization ring 62 is mounted between inboard and outboard aft portions 64 and 66 of the static ring structure and may be longitudinally reciprocated by actuators (e.g., pneumatic or hydraulic actuators—not shown). In the condition of FIG. 1, the synchronization ring is at a forwardmost/upstreammost position. The synchronization ring is coupled to each flap pair by an associated linkage 70. Each linkage 70 includes a central bell crank 72 pivotally coupled by a hinge mechanism to a bell crank ground point 74 at the trailing edge of the static ring structure inboard portion 64 for relative rotation about a fixed transverse axis 504. To drive rotation of the bell crank through its range of rotation about the axis 504, the bell crank is coupled to the synchronization ring by an associated H-link 76. A forward end of the H-link is pivotally coupled to the synchronization ring by a hinge mechanism for relative rotation about a transverse axis 506 which shifts longitudinally with the synchronization ring. An aft end of the H-link is pivotally coupled to the bell crank by a hinge mechanism for relative rotation about a transverse axis 508 which moves along a circular path segment centered about the axis 504 in response to linear translation of the axis 506. Thus, as viewed in FIG. 1, a rearward shift of the synchronization ring produces a clockwise rotation of the bell crank about the axis 504. Rotation of the bell crank is transferred to articulation of the associated flap pair by an associated pair of transfer links 78. Forward/upstream ends of each pair of transfer links are pivotally coupled to the bell crank for relative rotation about a transverse axis 510 which also moves along a circular path segment centered about the axis 504 in response to linear translation of the axis 506. Aft/downstream ends of the transfer links are pivotally coupled to the divergent flap 26 for relative rotation about a transverse axis 512. As discussed below, in the exemplary embodiment movement of the axis 512 is not entirely dictated by the rotation of the bell crank and associated static ring translation. Rather, it may be influenced by other forces, namely aerodynamic forces arising from relative pressures internal and external to the nozzle. In exemplary embodiments, the axis 512 falls aft of the axis 502 and along a forward half of the span between upstream and downstream ends of the divergent flap. More narrowly, it falls along a forward third, and, in the illustrated embodiment, approximately in between about the first 5% and 15% of such span.

In the exemplary embodiment, the external flap 50 has a forward end 90 pivotally coupled by a hinge mechanism to the static structure outboard portion 66 for relative rotation about a fixed transverse axis 520. Proximate its downstream end 92, the external flap is pivotally coupled by a hinge mechanism to the divergent flap 26 (slightly more forward of its downstream end 28) for relative rotation about a transverse axis 522. The external flap is configured so that the span between the axes 520 and 522 is extensible and contractible such as by having an upstream link 94 telescopically mounted relative to a main body portion 96 of the external flap and coupling the external flap to the static ring structure. The extensibility/contractability may have a limited range. As explained in greater detail below, a further limitation on that range may be desirable. To that end, a secondary link or mode strut 100 is provided having a forward end portion 102 pivotally coupled to the static ring structure for relative rotation about a fixed transverse axis 524 which may be close to the axis 520. If the axes 520 and 524 are coincident, it may be advantageous to drill one hole through all pivot points for low cost. However, if the width of the external flap 50 is such that the main body portion 96 on either circumferential side of the flap are substantially circumferentially spaced from the mode strut, it may be advantageous to locate the axis 520 relatively closer to the engine centerline than the axis 524 so as to maintain a good mechanical advantage for the mode strut.

An aft end portion 104 of the mode strut is pivotally coupled to the divergent flap 26 for relative rotation about an axis 526 fixed relative to the mode strut but floating relative to the divergent flap with a restricted range of movement. The exemplary range of movement is provided by the use of a pair of mounting brackets 110 at an intermediate location on the divergent flap, each having a slot 112 accommodating an obround slider 113 on a pivot shaft 114 fixed along the axis 526 relative to the mode strut. The slider and shaft are free to move along the slot between first and second ends 116 and 118 thereof. An exemplary intermediate location is, approximately within the middle third of the divergent flap length and the middle third of the span between axes 512 and 522.

Figure 2:
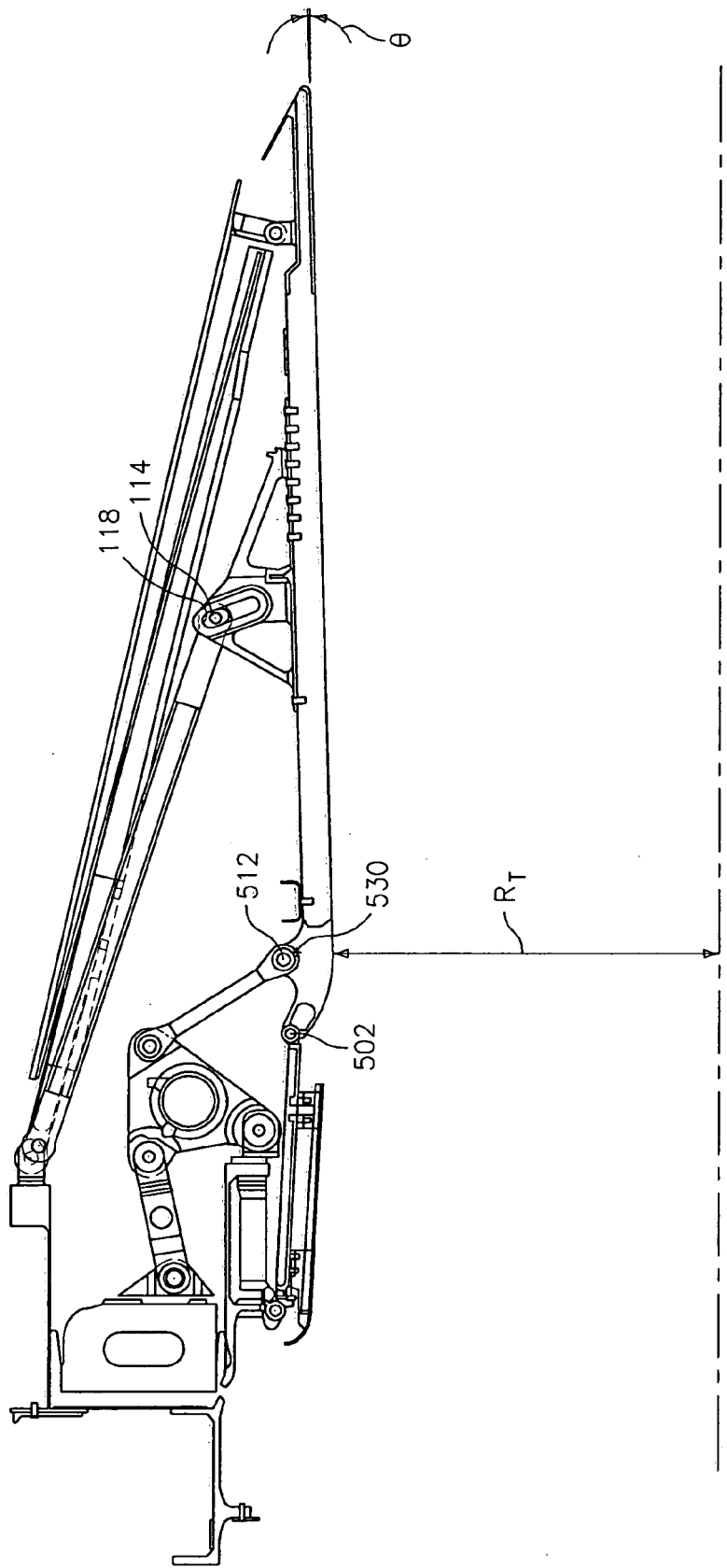
FIG. 2 is a view of the nozzle of FIG. 1 in a second condition.

In operation, the position of the synchronization ring 62 determines a nominal throat radius $R_T$ and associated throat area (i.e., a throttle condition). In a given synchronization ring position, the aerodynamic forces may then determine the mode which is nominally associated with the divergent flap interior surface angle θ. FIG. 1 shows the synchronization ring at the forward extremity of its range of motion, thereby establishing the maximum nominal throat area. FIG. 1 further shows a high mode condition in which the aerodynamic forces place the divergent flap in its maximum θ condition with the slider 113 bottomed against the slot end 116. Under changed conditions, the force balance across the combination of external flap 50 and divergent flap 26 may produce an alternate θ. For example, FIG. 2 shows a maximum area, minimum θ low mode condition in which the slider 113 is substantially bottomed against the slot end 118. In an alternate configuration, the operation of the mode strut is reversed (i.e., the slider arrangement is at the strut's connection to the static structure rather than at its connection to the divergent flap).

During the transition between high and low modes for a given nominal throat area, there will be slight movement of the axes 502 and 512. The instantaneous center of rotation of the divergent flap occurs along the intersection 530 of a pair of planes respectively defined by axes 503 and 502 on the one hand and 510 and 512 on the other. With this intersection falling at or near the nozzle throat surface, changes in throat area with mode are limited. In an exemplary embodiment, throat area change with mode shift is well under 2% across all nominal throat areas with the maximum change at the minimum throat area condition. It may be advantageous to configure any implementation such that the minimum change in throat area with mode shift occurs at a particularly sensitive point in the flight envelope for a given application (e.g., design points for aerial refueling, landing, and the like). Relative to an alternate situation in which the axis 502 is fixed, this can provide a greater consistency in throat radius during mode transitions at a given nominal throat area. Clearly, the exact location of the instantaneous throat moves slightly along the surface portion 40 which may also entail a slight longitudinal throat position change in addition to the slight throat radius change.

Figure 3:
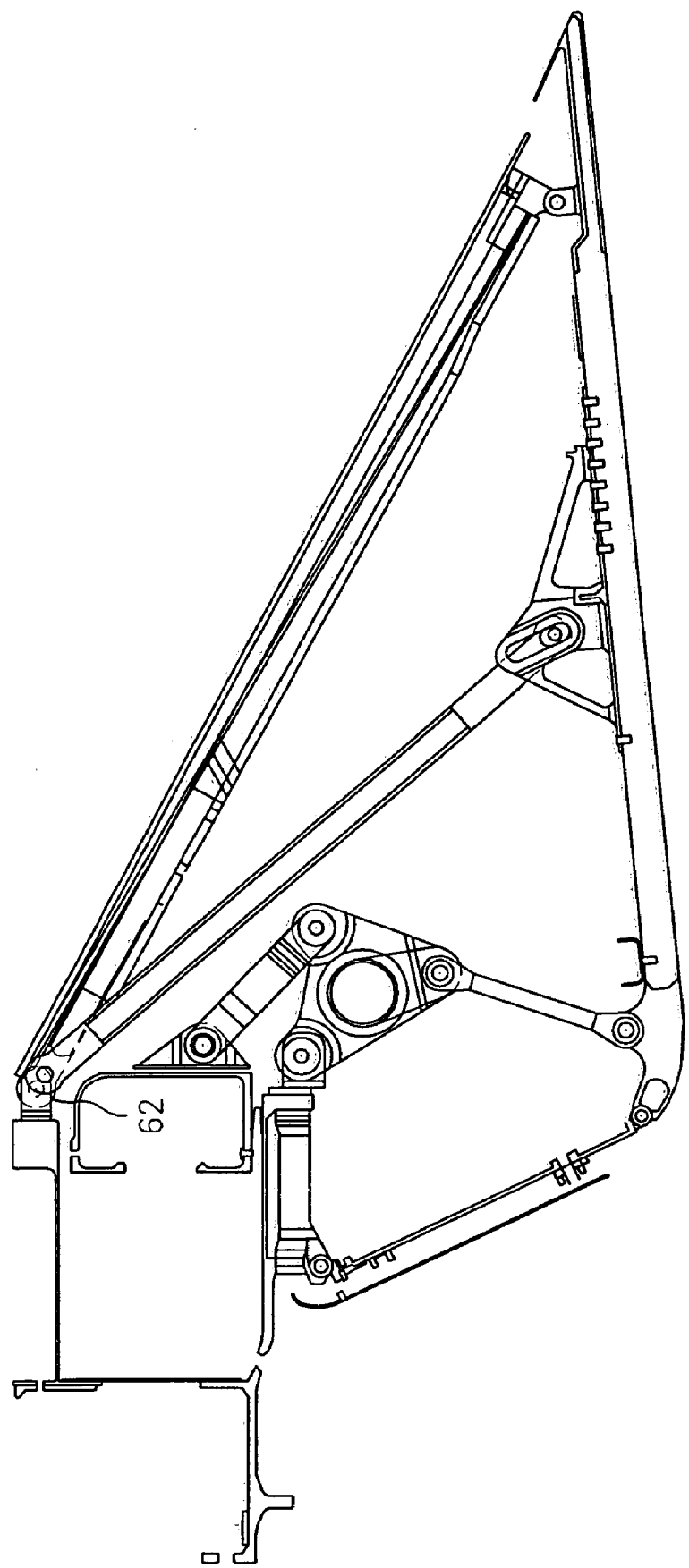
FIG. 3 is a view of the nozzle of FIG. 1 in a third condition.
Figure 4:
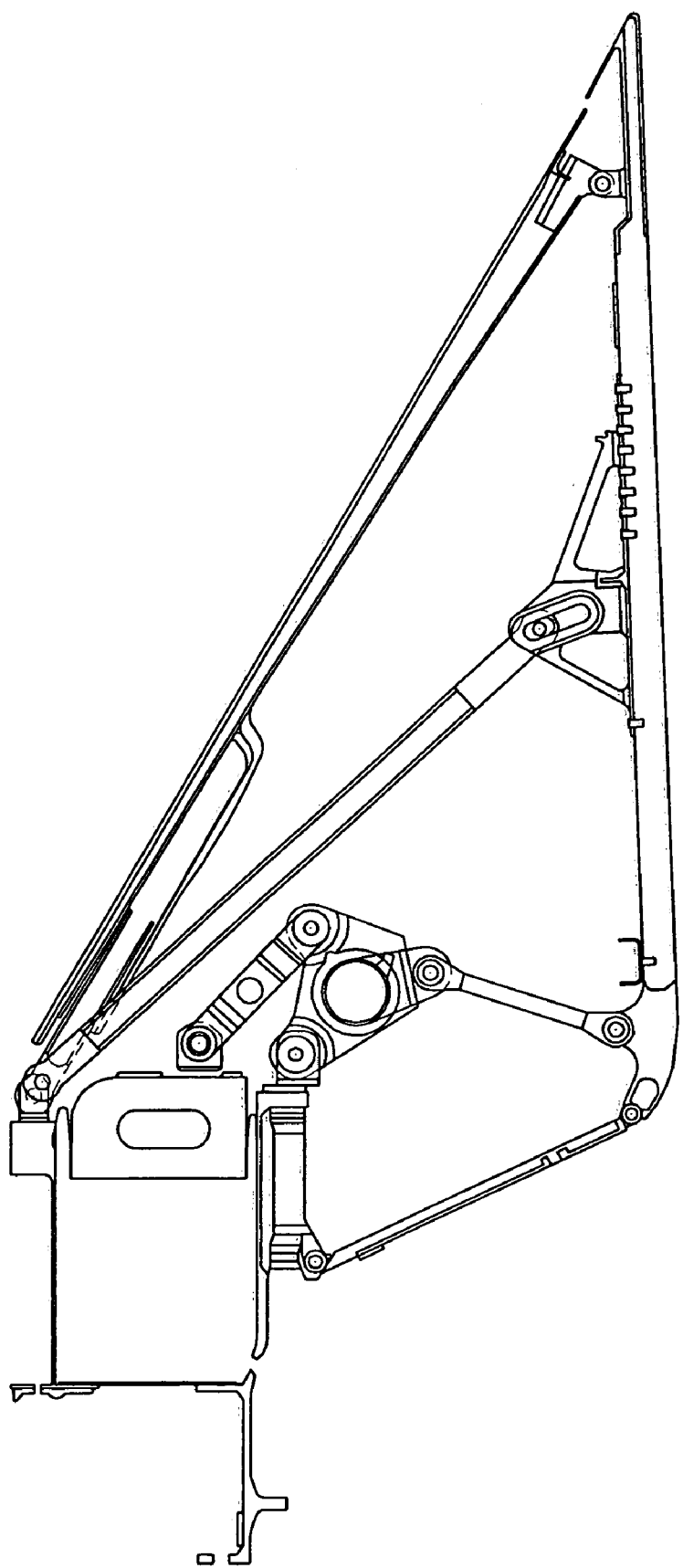
FIG. 4 is a view of the nozzle of FIG. 1 in a fourth condition.

FIG. 3 shows the synchronization ring 62 shifted to the rearmost extreme of its range of motion to produce a minimum throat area/radius condition. Specifically, FIG. 3 shows this in a high mode condition as discussed above. During the transition of the synchronization ring, there is associated telescoping (contraction as shown) of the external flap. The need to accommodate a sufficient range of telescoping across the throat area range may, as noted above, exceed a desired range of extensibility associated with the mode shift. Thus the mode strut may still operate to restrict and as means for restricting a range of movement of the divergent flap and external flap combination and extensibility of the external flap. FIG. 4 shows the flap in a low mode minimum throat area/radius condition.

Advantageously, the actuation linkage and flap geometry is chosen to permit a range of throat area conditions effective to address the desired performance envelope. An exemplary envelope would include a maximum throat radius which is about 150% of a minimum throat radius (e.g., in excess of 140%). Similarly, the mode strut and its mounting are configured to provide a desired mode range. An exemplary mode range involves a minimum θ of between −5° and 5° and a maximum θ of between 10° and 25°. Such range may advantageously be provided across all throat areas.

The present nozzle may be engineered as a redesign of an existing nozzle or otherwise engineered for an existing environment (e.g., as a drop-in replacement for an existing nozzle). For example, the illustrated nozzle may be formed as a replacement for a generally similar nozzle but wherein a bell crank is connected to the convergent flap (or the hinge point between the convergent and divergent flaps) rather than to the divergent flaps. The reengineering could preserve the synchronization ring and potentially portions of the linkage including the bell crank. Reengineering also could preserve basic details of the external flap and mode strut, although potentially requiring minor geometry tweaks if the exact ranges of throat area and flap angle are to be maintained.

One or more embodiments of the present invention have been described. Nevertheless, it will be understood that various modifications may be made without departing from the spirit and scope of the invention. For example, when implemented as a reengineering of an existing nozzle, various details of the existing nozzle may be preserved either by necessity or for convenience. Additionally, the principles may be applied to non-axisymmetric nozzles in addition to axisymmetric nozzles and to vectoring nozzles in addition to non-vectoring nozzles. Accordingly, other embodiments are within the scope of the following claims.

What is claimed is:

1. A turbine engine nozzle subassembly comprising:
an upstream flap;
a downstream flap pivotally coupled to the upstream flap for relative rotation about a hinge axis; and
an actuator linkage coupled to the downstream flap along a forward half thereof for actuating the upstream and downstream flaps between a plurality of throat area conditions while permitting aerodynamically-induced orientation changes of the downstream flap.

2. The subassembly of claim 1 further comprising:
an external flap pivotally coupled to the downstream flap and to an environmental structure so that a span between respective coupling locations with said downstream flap and environmental structure is extensible and contractable responsive to aerodynamic forces; and
means for restricting an extensibility range of said external flap.

3. The subassembly of claim 2 wherein:
said means for restricting comprises a secondary link having a first pivotal coupling location to the environmental structure and a second pivotal coupling location to the downstream flap, the second pivotal coupling location being intermediate the coupling location of the downstream flap to the external flap and a coupling location of the actuator linkage to the downstream flap; and
the secondary link has a restricted free float range relative to the downstream flap.

4. The subassembly of claim 1 wherein:
said throat is formed along a longitudinally convex surface portion of the downstream flap.

5. The subassembly of claim 1 wherein:
said throat is formed downstream of a hinge axis coupling the upstream flap to the downstream flap.

6. A nozzle comprising:
a circumferential array of subassemblies of claim 1; and
a synchronization ring mounted for longitudinal translation between first and second positions and coupled to said linkage of each of the subassemblies so that said translation causes said actuating.

7. The nozzle of claim 6 wherein:
the linkage of each of the subassemblies comprises a bell crank and a transfer link coupling the bell crank to the downstream flap.

8. A turbine engine nozzle comprising:
a static structure;
a plurality of flap subassemblies comprising:
an upstream flap pivotally coupled to the static structure for relative rotation about an axis essentially fixed relative to the static structure; and
a downstream flap pivotally coupled to the upstream flap for relative rotation about a hinge axis permitting aerodynamically-induced mode changes of the downstream flap; and
means for actuating articulation of the upstream and downstream flaps of the plurality of flap subassemblies within a range of areas of a throat along the downstream flap while minimizing changes in throat area at a given design point induced by said mode changes.

9. The nozzle of claim 8 wherein:
the plurality of flap subassemblies are axisymmetrically arranged about an engine centerline;
said articulation is simultaneous for each of the flap subassemblies; and
each of the plurality of flap subassemblies further comprises an external flap pivotally coupled to the downstream flap.

10. The nozzle of claim 8 wherein:
said throat is formed along a longitudinally convex surface portion of the downstream flap.

11. A turbine engine nozzle subassembly comprising:
an upstream flap;
a downstream flap pivotally coupled to the upstream flap for relative rotation about a hinge axis; and
an actuator linkage coupled to the downstream flap along a forward half thereof for actuating the upstream and downstream flaps between a plurality of throat area conditions, said throat being formed along a longitudinally convex surface portion of the downstream flap, the actuator linkage coupled to the upstream flap only via the downstream flap.

12. A turbine engine nozzle subassembly comprising:
an upstream flap;
a downstream flap pivotally coupled to the upstream flap for relative rotation about a hinge axis; and
an actuator linkage coupled to the downstream flap along a forward half thereof for actuating the upstream and downstream flaps between a plurality of throat area conditions and comprising a bell crank and a transfer link coupling the bell crank to the downstream flap.

13. The subassembly of claim 12 wherein:
said throat is formed downstream of a hinge axis coupling the upstream flap to the downstream flap.

14. The subassembly of claim 12 wherein:
the linkage permits aerodynamically-induced orientation changes of the downstream flap.

15. A turbine engine nozzle subassembly comprising:
a convergent flap;
a divergent flap; and
an actuation linkage, coupled to the divergent flap so as to permit an aerodynamically-induced mode change articulation of the divergent flap to rotate the divergent flap about a non-fixed instantaneous center of rotation while simultaneously rotating the divergent flap relative to the convergent flap about a non-fixed hinge axis.

16. The subassembly of claim 15 wherein:
a nozzle throat is formed downstream of a hinge axis coupling the convergent flap to the divergent flap.

17. A turbine engine nozzle subassembly comprising:
an upstream flap;
a downstream flap pivotally coupled to the upstream flap for relative rotation about a hinge axis; and
an actuator linkage coupled to the downstream flap along a forward half thereof for actuating the upstream and downstream flaps between a plurality of throat area conditions, said throat being formed along a longitudinally convex surface portion of the downstream flap downstream of a hinge axis coupling the upstream flap to the downstream flap.

* * * * *